June 11, 1929.  J. C. SHARP  1,716,983
HOLLOW LUBRICATING SHAFT
Filed Feb. 15, 1923
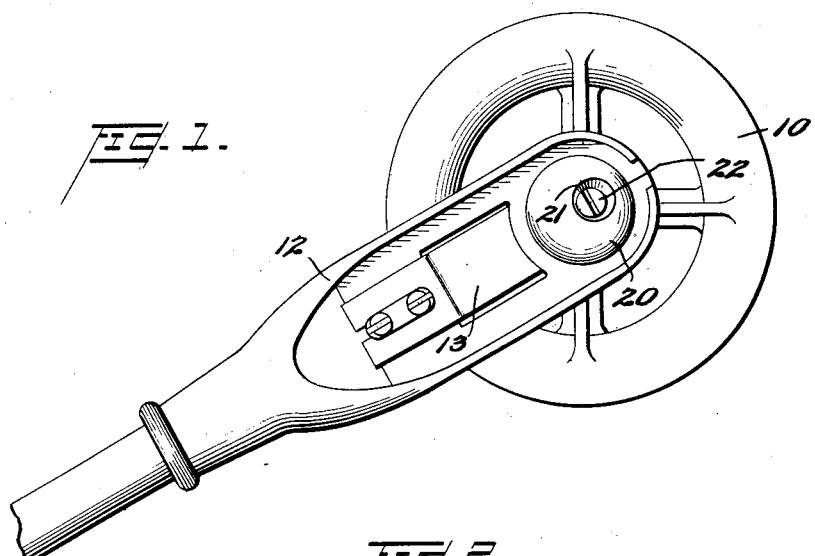
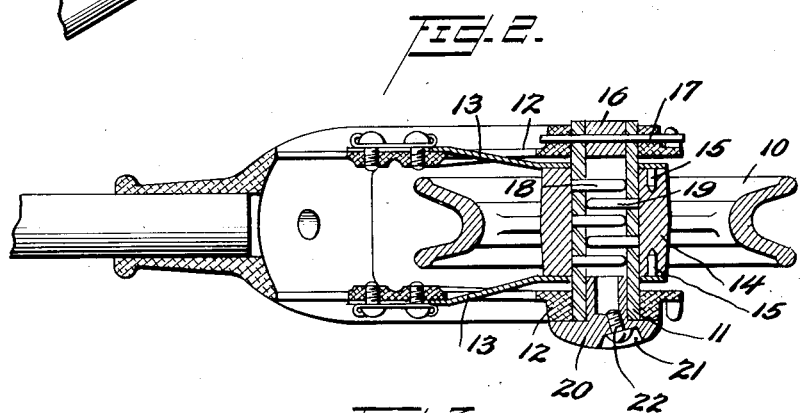
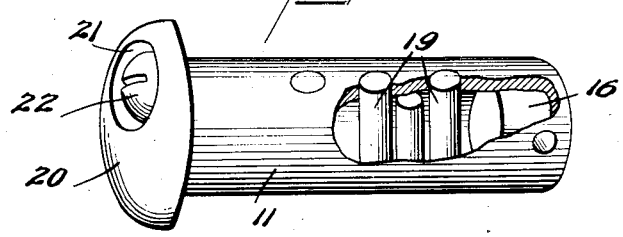
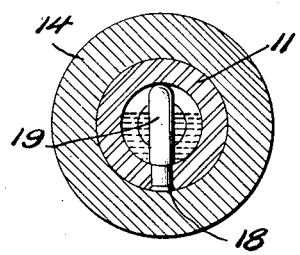
Inventor
John Cessna Sharp
By C. J. Stockman
Attorney Patented June 11, 1929.

1,716,983

UNITED STATES PATENT OFFICE.

JOHN CESSNA SHARP, OF CHATTANOOGA, TENNESSEE.

HOLLOW LUBRICATING SHAFT.

Application filed February 15, 1923. Serial No. 619,207.

This invention has particular relation to a hollow lubricant carrying shaft or the like capable of feeding oil in a thin layer and in an economical manner to a trolley wheel or other appropriate device mounted on and intended to be lubricated by said shaft or the like.

One object of the invention is the production of an improved lubricant carrying shaft wherein the shaft may be filled with lubricant without danger of wastage of lubricant or inconvenience in the assembling of the shaft in the harp or other part with which it is associated and from which shaft the lubricant may be fed economically and efficiently in the operation of the device.

A still further object of the invention is the production of a bearing shaft provided with inserts of a particular form and placed in position in a particular manner to most efficiently and economically feed the lubricant therefrom.

Other objects and advantages of the invention will hereinafter appear in the following description and the novel features thereof will be particularly pointed out in the appended claims.

Like reference characters indicate like parts throughout the several figures of the drawings, in which Figure 1 is the side elevation of the trolley harp and wheel embodying my invention, Figure 2 is a section through the same showing the elements of my invention in cross section, Figure 3 is a perspective of my lubricant carrying shaft shown with wooden inserts as they appear after being driven into the same, Figure 4 is a section through the shaft itself.

One important utility of the present invention is its application or use as a member of a trolley harp for lubricating the trolley wheel and that particular application of the invention has been shown in the accompanying drawings and will be hereinafter described in detail, as an example. In the drawings, therefore, 10 designates a trolley wheel, rotatably mounted upon a shaft 11 which shaft is held in apertures in the forked end of a harp 12. Contact springs 13 are attached to the harp and have their ends bearing upon the faces of the hub of the wheel. These parts will now be specifically described and their individual functions pointed out after which a recital of their conjoint use will be given.

The wheel 10 is of the usual construction with a hub 14, which is bored to receive the shaft 11. The hub is shown as slightly wider than the rim of the wheel, and is provided with recesses extending from the side faces thereof. In these recesses are mounted wooden inserts 15 of a type hereinafter to be explained, the purpose of said inserts being to absorb lubricant as long as there is a surplus thereof upon the contact springs 13, and to dispense lubricant whenever there is a shortage thereof.

The shaft 11 is a length of tool steel tubing very accurately turned to fit the bearing in the hub of the trolley wheel. It is closed at one end by the driven plug 16, and through this end of the shaft and through the plug is provided a transverse aperture for the purpose of pinning it to one fork of the harp 12 by means of the pin 17. Along the length of the shaft circular apertures are provided and slightly countersunk as shown exaggerated at 18 through which the wooden inserts 19 may be driven into the shaft and diametrically across the hollow interior thereof to the opposite wall. The end of the insert rests securely against the opposite wall and might be formed roughly to conform to the curvature thereof; it does not make a sufficiently tight fit, however, with said wall to prevent lubricant from entering the end of the insert and being fed by capillarity through the insert to the outer surface of the shaft when in actual operation. These inserts or plugs are arranged in two rows in staggered relation, the inserts of one row entering the shaft at 180° from those of the other row as shown in Figures 2 and 3, but it will be appreciated that they may be arranged in more than two rows and staggered.

In driving the inserts into place, it will be appreciated that the wooden plug selected is slightly larger than the bore of the aperture in the wall of the shaft and in being driven the plug will therefore be slightly compressed but after passing through the wall aperture it will again expand. This method of inserting plugs will provide a slightly pressed neck portion thereof lying within the aperture of the shaft wall, which will tend to control the flow of lubricant through the plug or insert to the bearing surface of the shaft, and also assist in maintaining the plugs in place in the shaft.

The plugs employed in my wheel and harp are preferably made of wood specially prepared to free the same from resins and other natural pore-filling substances to thereby increase the capillarity thereof and render them most suitable for this purpose. In a co-pending application for patent Serial Number 606,332, filed December 11, 1922, I have described and claimed the wooden inserts, per se, and the method of preparing the same for use in connection with bearing elements of my design.

After the inserts are driven into place, they are turned down so that their ends will not project sufficiently beyond the cylindrical surface of the shaft to cause them to glaze.

The open end of the shaft 11 is closed by the cap plug 20, which is driven into place. This cap plug is provided with a screw threaded aperture and communicating pocket 21, the aperture also communicating with the hollow interior of the shaft. The machine screw 22 is used to close the aperture and the head thereof lies within the pocket 21. By means of said screw threaded aperture, the shaft is filled with liquid lubricant when the screw 22 is employed to close the aperture. It will be noted that the shaft may be completely filled with lubricant before it is assembled in the harp, but that in refilling the shaft subsequently the level of the lubricant will be upon a line with the upper edge of the aperture as clearly shown in Figure 4. This is desirable since when first using the shaft it is best that lubricant in abundance be supplied to the parts, but after that the incomplete filling is ample for the purpose of efficient lubrication and desirable to prevent over lubrication. In the use of the harp, weather or friction conditions may cause the parts to be heated, and if lubricant completely fills the shaft, it will be expanded and cause an excessive feed of lubricant to the bearing surface; if, however, the shaft contains some air which may be compressed slightly or permitted to escape the tendency to overfeed the lubricant is avoided.

The harp of my invention is made of the standard copper-aluminum bronze, the proportions of the ingredients in which are those usually given, copper 90%, aluminum 10%. This gives strength, high conductivity and lightness to the harp.

The harp is formed at its upper end without projections upon which the trolley wires might engage in case the wheel runs off the wire. The lightness in weight of the harp is also of distinct advantage should the wheel run off the wire as it reduces the shock of contact with the trolley cross wires and the consequent danger of breakage, usual in heavier harps. These results are not obtained at the expense of a reduction in conductivity, as the materials of the parts of which my device is formed are of relatively high value as conductors.

Having described my invention, what I claim as new and desire to secure by Letters Patent is:—

1. A shaft or the like having in its interior a chamber for a lubricating oil and formed with a plurality of openings each of which extends to said chamber from the outer surface of the shaft, and capillary oil feeders, respectively, extending through said openings and into said chamber and arranged wholly under the area of the shaft, each feeder consisting of a wooden plug whose cross-sectional area is greater than the diameter of the corresponding opening to cause its outer end portion to be constricted by said opening, the inner end portion of each plug being exposed in the chamber in the interior of said shaft.

2. A shaft or the like having in its interior a chamber for a lubricating oil and provided with a plurality of openings each of which extends to said chamber from the outer surface of the shaft, and capillary oil feeders whose outer end portions are tightly fitted in the openings in the shafts and whose inner end portions are exposed for a substantial distance in the chamber in said shaft, each of said feeders formed of a wooden plug which has been deprived of its natural pore-filling substances to thereby increase its capillarity.

3. A shaft or the like having in its interior a chamber for a lubricating oil and formed with a series of openings which are arranged in a staggered relation and extend from the outer surface of the shaft to said chamber, and a series of capillary feeders formed of wooden plugs, wholly arranged within the area of the shaft and extending diametrically thereof and in staggered relation one to another, each plug having its outer extremity exposed at the bearing surface of the shaft and its portion adjacent thereto tightly fitted in the corresponding opening and having its inner end portion exposed for a substantial distance in the lubricating chamber and terminating in said chamber.

4. A shaft or the like having in its interior a chamber for a lubricating oil and formed with a series of openings which are arranged in a staggered relation and extend from the outer surface of the shaft to said chamber, and a series of correspondingly staggered capillary oil feeders wholly arranged within the area of the shaft and extending diametrically thereof through said openings, said feeders being formed of wooden plugs which have been deprived of their natural pore-filling substances, to increase the capillarity thereof, and are of greater cross sectional area than the openings in the shaft, respectively, and have their outer extremities exposed at the outer surface of the shaft and their inner end portions exposed for a substantial distance in the lubricating chamber and terminating in said chamber.

In testimony whereof I affix my signature.

JOHN CESSNA SHARP.